(12) United States Patent
Gourlay

(10) Patent No.: US 9,709,721 B2
(45) Date of Patent: Jul. 18, 2017

(54) LIGHT GUIDES

(71) Applicant: ITI SCOTLAND LIMITED, Glasgow (GB)

(72) Inventor: James Gourlay, Livingston (GB)

(73) Assignee: DESIGN LED PRODUCTS LIMITED, Edinburgh, Scotland (GB)

(*) Notice: Subject to any disclaimer, the term of this patent is extended or adjusted under 35 U.S.C. 154(b) by 1 day.

(21) Appl. No.: 14/667,051

(22) Filed: Mar. 24, 2015

(65) Prior Publication Data

US 2015/0260898 A1 Sep. 17, 2015

Related U.S. Application Data

(63) Continuation of application No. 13/125,134, filed as application No. PCT/GB2009/051409 on Oct. 20, 2009, now abandoned.

(30) Foreign Application Priority Data

Oct. 21, 2008 (GB) .................................. 0819308.8

(51) Int. Cl.
| | |
|---|---|
| *G02F 1/13357* | (2006.01) |
| *F21V 8/00* | (2006.01) |
| *B32B 37/00* | (2006.01) |
| *B32B 38/14* | (2006.01) |
| *F21V 7/22* | (2006.01) |

(52) U.S. Cl.
CPC ........... *G02B 6/0016* (2013.01); *G02B 6/007* (2013.01); *G02B 6/0041* (2013.01); *G02B 6/0065* (2013.01); *G02B 6/0068* (2013.01); *G02B 6/0073* (2013.01); *G02B 6/0076* (2013.01); *Y10T 156/10* (2015.01)

(58) Field of Classification Search
None
See application file for complete search history.

(56) References Cited

U.S. PATENT DOCUMENTS

| | | | | |
|---|---|---|---|---|
| 4,877,451 | A * | 10/1989 | Winnik | .................. B82Y 30/00 106/287.11 |
| 5,408,387 | A | 4/1995 | Murase et al. | .................... 362/31 |
| 5,836,096 | A | 11/1998 | Brauer | .................... G02B 27/02 |
| 5,971,559 | A | 10/1999 | Ishikawa et al. | ............... 362/31 |

(Continued)

FOREIGN PATENT DOCUMENTS

| | | | | |
|---|---|---|---|---|
| CN | 101196573 A | 6/2008 | ............. G02B 5/02 |
| DE | 20 2007 017 224 | 4/2008 | ............. G09F 13/04 |

(Continued)

OTHER PUBLICATIONS

Examination Report under Section 18(3), dated Oct. 23, 2012, issued in UK Patent Application No. GB0819308.8.

(Continued)

*Primary Examiner* — Ryan Crockett
(74) *Attorney, Agent, or Firm* — Harness, Dickey & Pierce, P.L.C.

(57) ABSTRACT

This invention relates to a light guide plate and methods of manufacture. The light guide plate is suitable for use in a range of applications, particularly those which require backlighting for display units, for example, liquid crystal displays. The light guide plate comprises a combination of light guide layers and one or more scattering features.

22 Claims, 1 Drawing Sheet

(56) References Cited

U.S. PATENT DOCUMENTS

| | | | |
|---|---|---|---|
| 6,030,108 A | 2/2000 | Ishiharada et al. | 362/562 |
| 6,337,946 B1 | 1/2002 | McGaffigan | 385/901 |
| 6,356,389 B1 | 3/2002 | Nilsen et al. | 359/625 |
| 6,443,579 B1 | 9/2002 | Myers | 359/613 |
| 6,561,663 B2 | 5/2003 | Adachi et al. | 362/31 |
| 6,609,799 B1 | 8/2003 | Myers | 359/613 |
| 6,947,110 B2 | 9/2005 | Morimoto et al. | 349/114 |
| 6,969,189 B2 | 11/2005 | Lee et al. | 362/631 |
| 7,287,891 B1 | 10/2007 | Park et al. | 362/555 |
| 7,288,320 B2 | 10/2007 | Steenblik et al. | 428/403 |
| 7,334,933 B1 | 2/2008 | Simon | 362/615 |
| 7,663,804 B2 | 2/2010 | Chang | 359/599 |
| 7,719,016 B2 | 5/2010 | Nada et al. | 257/95 |
| 7,780,306 B2 | 8/2010 | Hoshi | 362/97.1 |
| 7,791,683 B2 | 9/2010 | Larson et al. | 349/62 |
| 7,929,816 B2 | 4/2011 | Meir et al. | 385/39 |
| 7,954,990 B2 | 6/2011 | Gourlay | 362/616 |
| 7,959,343 B2 | 6/2011 | Ijzerman et al. | 362/625 |
| 7,980,747 B2 | 7/2011 | Vissenberg et al. | 362/612 |
| 8,011,818 B2 | 9/2011 | Negley | 362/613 |
| 8,092,064 B2 | 1/2012 | Erchak et al. | 362/613 |
| 8,128,272 B2 | 3/2012 | Fine et al. | 362/606 |
| 8,129,731 B2 | 3/2012 | Vissenberg et al. | 257/88 |
| 8,182,128 B2 | 5/2012 | Meir et al. | 362/612 |
| 8,215,815 B2 | 7/2012 | Meir et al. | 362/606 |
| 8,238,703 B2 | 8/2012 | Meir et al. | 385/39 |
| 8,264,622 B2 | 9/2012 | Gourlay | 349/3 |
| 8,393,748 B2 | 3/2013 | Herrmann et al. | 362/97.3 |
| 8,393,775 B2 | 3/2013 | Kim et al. | 362/613 |
| 8,432,527 B2 | 4/2013 | Tomlinson | 349/166 |
| 8,467,013 B2 | 6/2013 | Gourlay | 349/64 |
| 2002/0008807 A1 | 1/2002 | Miyatake et al. | 349/65 |
| 2003/0016314 A1 | 1/2003 | Dong et al. | 349/65 |
| 2003/0039113 A1 | 2/2003 | Murr et al. | 362/31 |
| 2003/0210222 A1* | 11/2003 | Ogiwara | G02B 6/0036 345/103 |
| 2003/0232179 A1 | 12/2003 | Steenblik et al. | 428/195.1 |
| 2004/0028875 A1 | 2/2004 | Van Rijn et al. | 428/98 |
| 2004/0067360 A1 | 4/2004 | Steenblik et al. | 428/402 |
| 2004/0085749 A1* | 5/2004 | Parker | F21V 5/00 362/601 |
| 2004/0130515 A1 | 7/2004 | Chuang et al. | 345/82 |
| 2004/0136667 A1* | 7/2004 | Leu | G02B 6/0043 385/120 |
| 2005/0265029 A1 | 12/2005 | Epstein et al. | 362/339 |
| 2006/0002146 A1 | 1/2006 | Baba | 362/613 |
| 2006/0046159 A1 | 3/2006 | Emslander et al. | 430/5 |
| 2006/0056166 A1 | 3/2006 | Yeo et al. | 362/19 |
| 2006/0083019 A1 | 4/2006 | Hahm et al. | 362/555 |
| 2006/0087827 A1 | 4/2006 | Jung et al. | 362/29 |
| 2006/0092663 A1 | 5/2006 | Noh et al. | 362/606 |
| 2006/0187552 A1 | 8/2006 | Huang et al. | 359/619 |
| 2006/0227323 A1 | 10/2006 | Goto | 356/336 |
| 2006/0256255 A1 | 11/2006 | Minami | 349/65 |
| 2007/0081339 A1 | 4/2007 | Chung et al. | 362/294 |
| 2007/0086179 A1 | 4/2007 | Chen et al. | 362/27 |
| 2007/0121340 A1 | 5/2007 | Hoshi | 362/600 |
| 2007/0133229 A1 | 6/2007 | Tsai | 362/633 |
| 2007/0147073 A1 | 6/2007 | Sakai et al. | 362/607 |
| 2007/0159699 A1 | 7/2007 | Wang et al. | 359/599 |
| 2007/0172171 A1 | 7/2007 | Van Ostrand et al. | 385/31 |
| 2007/0212533 A1 | 9/2007 | Jones et al. | 428/331 |
| 2007/0279773 A1 | 12/2007 | Johnson et al. | 359/831 |
| 2008/0007541 A1 | 1/2008 | Eliasson et al. | 345/176 |
| 2008/0013323 A1 | 1/2008 | Katsumoto et al. | 362/311 |
| 2008/0043173 A1* | 2/2008 | Lin | G02B 6/0051 349/65 |
| 2008/0043490 A1* | 2/2008 | Coleman | G02B 6/0036 362/623 |
| 2008/0055931 A1 | 3/2008 | Verstraete et al. | 362/612 |
| 2008/0080167 A1 | 4/2008 | Chang | 362/97 |
| 2008/0117620 A1 | 5/2008 | Hama et al. | 362/84 |
| 2008/0129927 A1 | 6/2008 | Hamada et al. | 349/65 |
| 2008/0130018 A1 | 6/2008 | Steenblik et al. | 356/625 |
| 2008/0137197 A1* | 6/2008 | Hsu | G02B 5/0215 359/599 |
| 2008/0152933 A1 | 6/2008 | Mizuno et al. | 428/480 |
| 2008/0266863 A1* | 10/2008 | Rinko | G02B 6/0018 362/278 |
| 2008/0285305 A1 | 11/2008 | Fujino et al. | 362/612 |
| 2008/0296792 A1* | 12/2008 | Gourlay | G02B 6/0021 264/1.24 |
| 2009/0086508 A1 | 4/2009 | Bierhuizen | 362/617 |
| 2009/0121988 A1 | 5/2009 | Amo et al. | 345/82 |
| 2009/0161341 A1 | 6/2009 | Meir et al. | 362/84 |
| 2010/0142222 A1 | 6/2010 | Vahabzadeh | 362/615 |
| 2010/0164079 A1 | 7/2010 | Dekker et al. | 257/676 |
| 2010/0328574 A1* | 12/2010 | Gourlay | G02B 6/0021 349/62 |
| 2011/0050735 A1 | 3/2011 | Bae et al. | 345/690 |
| 2011/0051037 A1 | 3/2011 | Kim et al. | 349/62 |
| 2011/0182084 A1 | 7/2011 | Tomlinson | 362/608 |
| 2011/0234941 A1 | 9/2011 | Gourlay | 349/64 |
| 2011/0317417 A1 | 12/2011 | Gourlay | 362/235 |
| 2012/0002438 A1 | 1/2012 | Gourlay | 362/606 |

FOREIGN PATENT DOCUMENTS

| | | | |
|---|---|---|---|
| EP | 0 797 045 | 9/1997 | F21V 8/00 |
| EP | 1 640 756 | 3/2006 | G02B 6/42 |
| EP | 1 860 919 | 11/2007 | H05B 33/00 |
| EP | 1 890 186 | 2/2008 | G02F 1/13357 |
| GB | 2 425 392 | 10/2006 | G02F 1/13357 |
| GB | 2 431 730 | 5/2007 | G02B 6/02 |
| GB | 2 438 440 | 11/2007 | G02B 6/00 |
| GB | 2 448 564 | 10/2008 | G02F 1/13357 |
| GB | 2 454 928 | 5/2009 | G02B 6/00 |
| GB | 2 459 888 | 11/2009 | H03K 17/955 |
| GB | 2 463 913 | 3/2010 | G02B 6/00 |
| GB | 2 464 916 | 5/2010 | G02F 1/13357 |
| GB | 2 468 353 | 9/2010 | G02B 6/00 |
| GB | 2 468 410 | 9/2010 | G02B 6/00 |
| GB | 2 468 411 | 9/2010 | G02B 6/00 |
| GB | 2 468 875 | 9/2010 | G02B 6/00 |
| GB | 2 475 510 | 5/2011 | G02B 6/00 |
| GB | 2 475 511 | 5/2011 | G02B 6/00 |
| GB | 2 475 738 | 6/2011 | G02B 6/00 |
| JP | 3019466 | 10/1995 | |
| JP | 2002-287143 | 10/2002 | G02F 1/13357 |
| JP | 2004-241282 | 8/2004 | F21V 8/00 |
| JP | 2004-296300 | 10/2004 | F21V 8/00 |
| JP | 2006-351375 | 12/2006 | F21V 8/00 |
| JP | 2007-012856 | 1/2007 | H01L 33/00 |
| JP | 2007-041622 | * 2/2007 | |
| JP | 2007-535790 | 12/2007 | F21V 8/00 |
| JP | 2008-096889 | 4/2008 | G02B 5/02 |
| JP | 2008-305642 | 12/2008 | F21V 8/00 |
| NL | WO 2008087572 A1 * | 7/2008 | G02B 6/0073 |
| WO | WO 96/21122 | 7/1996 | F21V 8/00 |
| WO | WO 01/51848 | 7/2001 | F21V 8/00 |
| WO | WO 2005/101070 | 10/2005 | G02B 6/00 |
| WO | WO 2005/107363 | 11/2005 | |
| WO | WO 2006/014822 | 2/2006 | G02B 6/02 |
| WO | WO 2006/126155 | 11/2006 | G02B 6/00 |
| WO | WO 2007/000695 | 1/2007 | H01L 23/36 |
| WO | WO 2007/034398 | 3/2007 | |
| WO | WO 2007/138294 | 12/2007 | G02B 6/12 |
| WO | WO 2007/143341 | 12/2007 | G02F 1/1335 |
| WO | WO 2008/038728 | 4/2008 | F21S 2/00 |
| WO | WO 2008/047286 | 4/2008 | F21V 8/00 |
| WO | WO 2008/061059 | 5/2008 | G02F 1/13357 |
| WO | WO 2008/087572 | 7/2008 | H01L 33/00 |
| WO | WO 2008/122909 | 10/2008 | F21S 2/00 |
| WO | WO 2009/066056 | 5/2009 | F21V 8/00 |
| WO | WO 2009/068860 | 6/2009 | F21V 8/00 |
| WO | WO 2010/035050 | 4/2010 | F21V 8/00 |
| WO | WO 2010/046694 | 4/2010 | F21V 8/003 |

(56) References Cited

FOREIGN PATENT DOCUMENTS

| WO | WO 2010/100504 | 9/2010 | ............... | G02B 6/00 |
|---|---|---|---|---|
| WO | WO 2010/100505 | 9/2010 | ............... | G02B 6/00 |

OTHER PUBLICATIONS

First Office Action, dated Aug. 27, 2012, issued in Chinese Patent Application No. 200980141892.4 with English Translation.
International Search Report (ISR) and Written Opinion (WO), dated Feb. 25, 2009 from PCT Application PCT/GB2008/003862.
International Search Report (ISR) and Written Opinion (WO), dated Mar. 12, 2009 from PCT Application PCT/GB2008/003928.
International Search Report (ISR) and Written Opinion (WO), dated Jan. 7, 2010 from PCT Application PCT/GB2010/050388.
International Search Report (ISR) and Written Opinion (WO), dated Feb. 23, 2010 from PCT Application PCT/GB2009/051270.
International Search Report (ISR) and Written Opinion (WO), dated Apr. 13, 2010 from PCT Application PCT/GB2009/051409.
International Search Report (ISR) and Written Opinion (WO), dated May 7, 2010 from PCT Application PCT/GB2010/050387.
International Search Report (ISR) and Written Opinion (WO), dated Jul. 1, 2010 from PCT Application PCT/GB2010/050388.
International Preliminary Report on Patentability (IPRP), dated Apr. 26, 2011 from PCT Application PCT/GB2009/051409.
International Preliminary Report on Patentability (IPRP), dated Nov. 2, 2009 from PCT Application PCT/GB2008/003862.
International Preliminary Report on Patentability (IPRP), dated Nov. 2, 2009 from PCT Application PCT/GB2008/003928.
International Preliminary Report on Patentability (IPRP), dated Sep. 6 2010 from PCT Application PCT/GB2009/051270.
UK Search Report, dated Mar. 10, 2008 in GB Application No. GB0723057.6.
UK Search Report, dated Mar. 20, 2008 in GB Application No. GB0723166.5.
UK Search Report, dated Jan. 8, 2009 in GB Application No. GB0819308.8.
UK Search Report, dated Jan. 15, 2009 under Section 17(5) in GB Application No. GB0819308.8.
UK Search Report, dated Feb. 13, 2009 in GB Application No. GB0817829.5.
UK Search Report, dated Jun. 9, 2009 in GB Application No. GB0905070.9.
UK Search Report, dated Jun. 30, 2009 in GB Application No. GB0903862.1.
UK Search Report, dated Feb. 11, 2011 in GB Application No. GB0920333.2.
UK Search Report, dated Feb. 15, 2011 in GB Application No. GB0920328.2.
UK Search Report, dated Mar. 1, 2011 in GB Application No. GB0920922.2.
UK Examination Report, dated Oct. 27, 2008 in GB Application No. GB0723166.5.
UK Examination Report, dated Jun. 28, 2011 in GB Application No. GB0817829.5.
UK Examination Report, dated Oct. 23, 2012 in GB Application No. GB0819308.8.
Office Action, dated Nov. 16, 2011 issued in U.S. Appl. No. 12/744,149.
Office Action, dated Aug. 27, 2012, issued in Chinese Patent Application No. 200980141892.4 with English Translation.
Office Action, dated Sep. 12, 2012 issued in U.S. Appl. No. 12/744,644.
Office Action, dated Jan. 2, 2013, issued in U.S. Appl. No. 13/125,134.
Office Action, dated Jan. 14, 2013, issued in Chinese Application No. 201080010523.4 with English Translation.
Office Action, dated Jan. 15, 2013, issued in U.S. Appl. No. 13/254,985.
Office Action, dated Jan. 29, 2013, issued in U.S. Appl. No. 13/254,990.
Office Action, dated Sep. 4, 2013, issued in U.S. Appl. No. 13/125,134.
Office Action, dated Sep. 5, 2013, issued in U.S. Appl. No. 13/254,985.
Office Action, dated Sep. 6, 2013, issued in U.S. Appl. No. 13/254,990.
Office Action, dated Sep. 13, 2013 issued in Japanese Patent Application No. JP 2011-532720.
Office Action, dated Oct. 22, 2013 issued in Japanese Patent Application No. JP 2011-552528.
Office Action, dated May 27, 2014 issued in Taiwanese Patent Application No. TW 098135636, with English Translation.
Office Action, dated Jul. 14, 2014, issued in Chinese Patent Application No. 201080010523.4, with English translation.
Office Action, dated Jul. 29, 2014, issued in Taiwan Patent Application No. 099106479, for which no English translation is available.
Office Action, dated Sep. 3, 2014 issued in Chinese Patent Application No. CN 2009801418924, with English Translation.
Office Action, dated Sep. 16, 2014, issued in Japanese Patent Application No. 2011-552528, with English Translation.
European Office Action (Communication pursuant to Article 94(3) EPC), dated Dec. 10, 2014, issued in European Patent Application No. 10 707 119.3-1562.
European Office Action (Communication pursuant to Article 94(3) EPC), dated Dec. 11, 2014, issued in European Patent Application No. 10 707 118.5-1562.

* cited by examiner

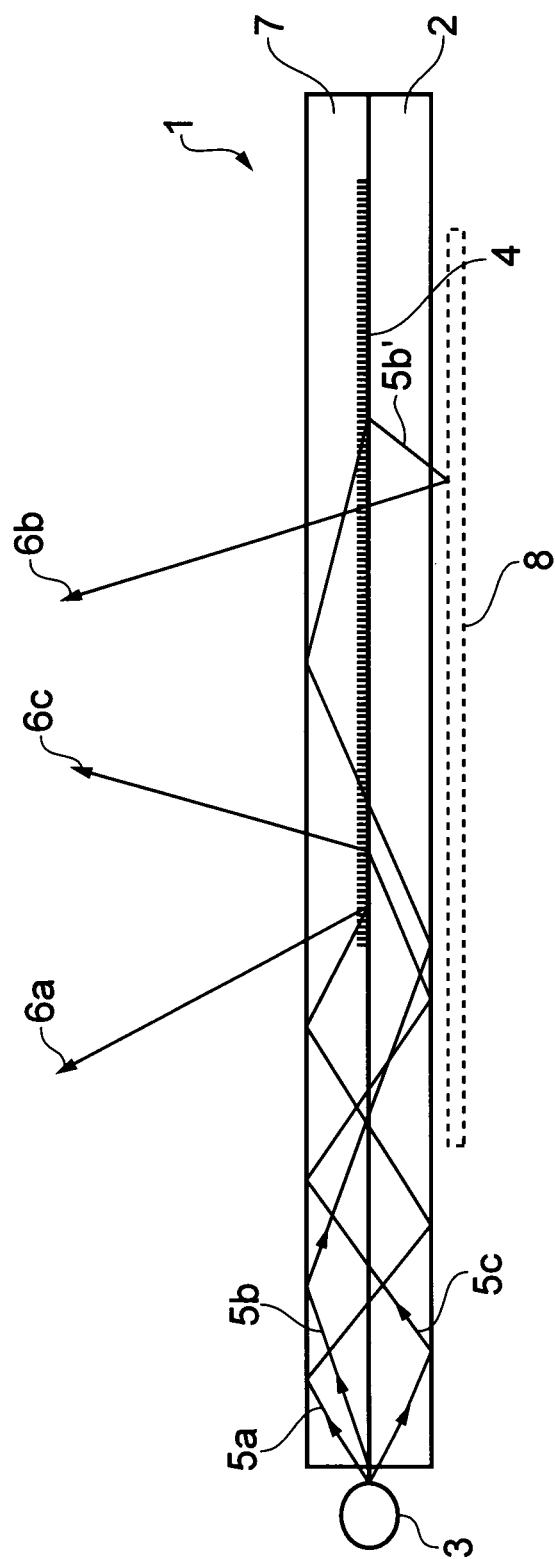

LIGHT GUIDES

FIELD OF THE INVENTION

This invention relates to a light guide plate and a light guide device comprising said light guide plate and methods of manufacture thereof. The light guide device is suitable for use in a range of applications, particularly in connection with the backlighting of displays, for example, liquid crystal displays.

BACKGROUND OF THE INVENTION

Light guide devices are known in the art and are utilised, by way of example, for illumination, backlighting, signage and display purposes. Typically, a light guiding device comprises a light source such as a fluorescent lamp or a plurality of light emitting diodes (LEDs) and a light guide plate which is constructed from a standard injection-moulded or machined transparent plastic component.

The light guide plate will often comprise suitable structural surface modifications which disturb the total internal reflection of the light from the light source such that the light is guided through the transparent light guide in a controlled manner and emitted in a substantially perpendicular direction to that of the direction of propagation of light within the transparent guide.

However, there are a number of problems associated with the manufacture of such a light guide plate. For instance, an injection-moulded light guide comprising these surface features requires a suitable mould to be micro-machined or laser cut, often at great cost.

Other techniques useful for preparing light guide plates include micro-stamping or hot embossing of suitable polymer sheets. However, the optical quality of the end light guide is restricted by the stamp quality and associated manufacturing process.

Furthermore, the micro-mechanical surface features described may easily be damaged during production of the light guide plate, or during assembly of a light guide device. In addition, stringent dust-free production and assembly processes are required to ensure that no dust particles are collected on the surface features, which may have an adverse effect on light propagation through the light guide. Consequently, production costs and assembly process costs are high.

Due to the increasing size of display units and therefore increasing size of backlights required for use in these units, the physical limitations of the manufacturing and assembly processes become more critical and the associated costs increase. There is therefore an ongoing need for alternative and/or improved light guide plates and devices and methods of formation thereof for use in, inter alia, backlighting applications.

It is an object of the present invention to provide a light guide plate that addresses one or more of the aforesaid disadvantages.

SUMMARY OF THE INVENTION

According to a first aspect of the invention, there is provided a light guide plate comprising a first layer of light guiding material upon a first surface of which is mounted a second layer of light guiding material and one or more light scattering features located at the interface between the first and second layers of light guiding material.

According to a second aspect of the invention, there is provided a light guide device comprising a light guide plate according to the first aspect of the invention and one or more light sources. The one or more light sources may be coupled externally to the light guide plate. Preferably the device is edge-lit. Optionally, the one or more light sources may not be encapsulated by a layer of light guiding material.

Light from the one or more light sources may be guided within both the first layer of light guiding material and the second layer of light guiding material by total internal reflection. The one or more light scattering features may disturb or break the total internal reflection of the guided light and the disturbed light may be emitted in a direction which is perpendicular or substantially perpendicular to the direction of guided light. As such, there is provided a light guide device comprising one or more light sources coupled to a light guide plate wherein said light guide plate comprises a first layer of light guiding material upon a first surface of which is mounted a second layer of light guiding material and one or more light scattering features located at the interface between the first and second layers of light guiding material, wherein light from the one or more light sources is guided within both the first layer of light guiding material and the second layer of light guiding material by total internal reflection and said one or more light scattering features disturb the total internal reflection of the guided light and the disturbed light is emitted in a direction which is perpendicular or substantially perpendicular to the direction of guided light.

According to a third aspect of the invention, there is provided a display device comprising a light guide device according to the second aspect of the invention. The display device may be a liquid crystal display device and may therefore comprise a liquid crystal cell which may also be referred to as a liquid crystal panel.

According to a fourth aspect of the invention, a method of producing a light guide plate comprises:
  a) applying to a first surface of a first layer of light guiding material one or more light scattering features; and
  b) mounting a second layer of light guiding material on the first surface of the first layer of light guiding material such that said one or more light scattering features are located at the interface between the first and second layers of light guiding material.

The method may further comprise combining the light guide plate with one or more light sources to form a light guide device. The method may also comprise forming a display device from said light guide device.

The method of applying the one or more light scattering features to the first surface of the first layer of light guiding material may comprise applying to the first surface an ink comprising the one or more light scattering features, and curing the ink. The method of applying the ink may comprise printing or stencilling the ink onto a first surface of the first layer of light guiding material. The one or more scattering features may be present on either or both of the first and second layers of light guiding material prior to the layers being combined.

In (b), the method of combining the first and second layers of light guiding material may comprise applying a liquid polymer to the first surface, and curing the liquid polymer.

The second layer of light guiding material may be combined with the first layer of light guiding material using a standard lamination technique. Such a technique may require the use of a transparent adhesive.

Since the one or more scattering features are located at the interface between the first and second layers of light guiding material and not on an external surface of a light guiding material, a light guide plate in accordance with the present invention is easier to clean and has a reduced risk of damage during handling.

Furthermore, the one or more light scattering features can be easily applied to the surface of a layer of light guiding material by any additive printing method, such as screen printing, for example, so as to obviate the need for expensive micromachining equipment previously used to create surface-modified structural scattering features, thereby reducing manufacture costs. The light guide plate according to the present invention may be produced using roll-to-roll production.

DETAILED DESCRIPTION OF THE INVENTION

The Layers of Light Guiding Material

The first and second layers of light guiding material which may also be referred to herein as first and second light guide layers are light transmissive. Preferably, the light guide layers are transparent to the light generated by the one or more light sources. The first light guide layer (which may be referred to as a substrate layer) may be formed from a transparent polymer sheet such as polyethylene terephthalate (PET), polycarbonate or acrylic. The second light guide layer may be made from a range of suitable polymers, including acrylics, epoxies or urethanes. The thickness of the first and second light guide layers may, independently of each other be about 0.1 to about 10 mm. Typically, the thickness of the light guide layers is of the order of about 0.1 mm. The refractive index of the light guide layers may be equal to or greater than 1.4. The refractive index of the light guide layers may, independently of each other, be selected from about 1.4 to about 1.7. The refractive index of the first layer and the second layer may be the same or may be different.

The second light guide layer may be combined with the first guide layer using a standard lamination technique. Such a technique may require use of a transparent adhesive. The transparent adhesive may have a refractive index which is the same or substantially the same as the refractive index of the first and second light guide layers. The first and second light guide layers may be optically joined during manufacture. Optically joined indicates that the layers are combined in such a way that, optically, these layers are effectively indistinguishable. The method of applying the second guide layer to the first guide layer may comprise applying and curing a liquid polymer. Methods of curing may comprise one or more of thermal, UV and/or two-part curing. The method may comprise printing, stencilling or dispensing the liquid polymer. Preferably, when the second light guide layer is applied in the form of a liquid polymer, the one or more scattering features will be disposed on the first light guide layer only, prior to combining the two light guide layers.

Scattering Features

The one or more light scattering features disturb the total internal reflection of the guided light. The one or more light scattering features may be referred to as light extraction features. The application of the scattering features may be accomplished by dispersing the features in a transparent printing ink and applying the ink to a surface of one or more of the light guide layers prior to the layers being combined.

Preferably, the scattering features are transparent to the light generated by the one or more light sources. The scattering features may be reflective, e.g. silver flakes. Preferably, the scattering features have a higher refractive index than the refractive index of the first light guide layer and/or second light guide layer, for example, about 1.6 to about 2, for example, greater than about 1.6. The one or more scattering features may be in particulate form. The one or more scattering features may have a particle size in the range of from about 1 μm to about 20 μm. Transparent particulate material which has a refractive index greater than the refractive index of the first light guide layer may be suitable for use in the present invention. The particles may be silica particles, e.g. silica spheres.

The scattering features, e.g. particles, may be loaded into an ink. The ink is light transmissive and preferably transparent to the light generated by the one or more light sources. The ink, which may be a polymeric material and may comprise the scattering features, may be applied to a light guide layer to form a thin pattern of features, according to any of a number of methods which may be referred to in general terms as additive printing processes. For example, conventional screen printing incorporates the use of a mesh screen with openings corresponding to the pattern required to be printed. This pattern may facilitate the accurate delivery of a volume of ink to the required areas of the light guide layer. Other suitable examples of additive printing methods include stencil printing, ink jet printing, flexographic printing and other known lithographic techniques.

Suitable inks for use in the present invention include those which are transparent to light generated from the one or more light sources, have a low refractive index, for example about 1.4 to about 1.5, and which may be UV or solvent cured. The refractive index of the ink may be the same or substantially the same as the refractive index of the first and/or second light guide layer. For example, a suitable UV curing ink is Windowtex Gloss which is an acrylic based, transparent UV curing polymer screen printable ink and is commercially available from MacDermid Autotype.

The ink may be applied in varying amounts and shapes which may depend on how close to the one or more light sources the ink is being deposited. The intensity of the light becomes less as the distance from the light source increases if light is scattered out of the light-guide. Therefore, smaller sized ink dots which are more widely spaced may be deposited closer to the position of the light source, whereas larger sized ink dots which are more closely spaced may be deposited as the distance from the light source increases. The ink dots may have a height of from about 0.01 mm to about 0.1 mm and may have a spacing and/or diameter of from about 0.1 mm to about 10 mm. The distribution of ink may be tailored to achieve a uniform or substantially uniform overall extraction of light. The printing pattern of the ink may determine the pattern of the particles on the surface of the light guide layer and therefore the location of the light scattering features.

An additional reflective element, e.g. a reflective sheet may, optionally, be located below the lower external surface of the first light guide layer in order to re-direct light which would otherwise be directed in a direction significantly away from the direction in which the device is intended to be viewed, for example, when used as a backlight.

In the present invention, particle size distribution measurements are measured using a Malvern Particle Size Analyzer, Model Mastersizer, from Malvern Instruments. A helium-neon gas laser beam is projected through a transparent cell which contains the particles suspended in an aqueous solution. Light rays which strike the particles are scattered through angles which are inversely proportional to the particle size. The photodetector array measures the quantity of light at several predetermined angles. Electrical signals proportional to the measured light flux values are then processed by a microcomputer system, against a scatter pattern predicted from theoretical particles as defined by the refractive indices of the sample and aqueous dispersant to determine the particle size distribution.

Light Guide Devices

Light guide devices are employed for a range of functions including illumination, backlighting, signage and display purposes. Typically, known light guide devices are constructed from an injection moulded or machined transparent plastic component, onto which a light source is integrated by means of mechanical attachment at the edge of the transparent plastic component. Examples of such devices are described in WO 2005/101070, the contents of which are incorporated herein in their entirety by reference.

Common to all of these devices is the fact that light from the light source is guided through a transparent guide plate, typically made of plastic, by total internal reflection. For edge-lit backlighting applications, light is emitted in a substantially perpendicular direction to that of the direction of propagation of the light within the transparent guide plate. This may be achieved through the light being directed so as to interact with scattering structures located on an external surface of the light guide plate, thus providing a non-flat surface, and which disturb the total internal reflection.

Light guide devices according to the present invention may be made using roll-to-roll production and screen printing techniques. The external surfaces of the light guide plate and light guide device according to the present invention are typically smoother than conventional light guide plates and preferably flat.

The integration of one or more light sources to the edge of the light guide plate according to the present invention may be achieved according to a range of techniques. A light source may be integrated by means of mechanical attachment at the edge of the light guide plate. The integration of one or more light sources to the edge of the light guide plate may be achieved by a butt coupling process where the one or more light sources are attached to the end of the light guide plate by UV curing with a high refractive index photonic adhesive that acts to reduce reflections from the ends of the light guide layer. The light guide plate may be hot cleaved or polished to provide a suitable optical surface at the end of the light guide plate which facilitates good coupling of light from the one or more light sources into the light guide layers.

Light Source

The one or more light sources can be any of those known to those skilled in the art, including those which are suitable for use in backlighting. Such light sources include one or more LEDs, cold cathode fluorescent lamps, laser diodes, organic light emitting diode sources, and other electroluminescent devices. The light may be non-directional.

The LEDs can be any of the designs known to those skilled in the art, including edge-emitting, side emitting, top emitting or bare die LEDs.

Uses of the Light Guide Device

The light guide device according to the present invention may be employed for a range of functions including illumination, backlighting, signage and display purposes.

Liquid crystal devices are well known in the art. A liquid crystal display device operating in a transmissive mode typically comprises a liquid crystal cell, which may also be referred to as a liquid crystal panel, a backlight unit incorporating a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawing and the following Example, in which:

FIG. 1 illustrates a light guide device according to the present invention and its effect on the transmission of light.

In FIG. 1, a light guide device (1) in side elevation comprises a first light guide layer (2) made from a transparent polymer substrate such as a polyester, polycarbonate or acrylic. Disposed between the first light guide layer and a second light guide layer (7) are a plurality of scattering features (4). The second light guide layer may be mounted on the first surface of the first light guide layer by any suitable means known in the art, thereby effectively encapsulating the scattering features between the first and second light guide layers. An external light source (3), for example an LED, is mechanically attached to one edge of the light guide layers, which together form a light guide plate, by any suitable means. Light (5a, 5b, 5c) generated by the LED light source is coupled into the light guide layers such that it propagates through the light guide layers in a direction substantially parallel to a plane defined by the light guide layers. The light is guided through the transparent light guide plate due to total internal reflection. When the light encounters the scattering features (4), it interacts with these so as to be redirected and exit the light guide device via the top surface, as indicated at 6a and 6c, thereby providing a backlighting function. Also shown is the optional presence of a reflective element (8), should it be required to redirect light indicated by (5b') through the top of the device and in the general direction indicated by (6b).

Typically, the refractive index of the second light guide layer (7) is substantially equal to the refractive index of the first light guide layer (2) such that light from the light source (3) is guided within both the first and second light guide layers due to the effects of total internal reflection. Therefore, the first light guide layer and second light guide layer with the scattering features disposed there between, collectively referred to as the light guide plate, form a composite structure that acts as the guiding media for light generated by the light source mounted on the edge of the light guide plate.

EXAMPLES

Example 1

A light guide plate in accordance with the present invention is constructed as follows. A 0.3 mm thick sheet of acrylic is used as the first light guide layer. Silica particles (particle size: 10 micron) are dispersed in Windowtex Gloss (thickness 0.025 mm), an acrylic based, transparent UV curing polymer screen printable ink which is commercially available from MacDermid Autotype. The resulting dispersion is screen printed onto the acrylic substrate and cured. A 0.1 mm thick layer of Dymax 4-20645, a UV curing, acrylic based transparent polymer (refractive index 1.51) is then applied to the same surface of the acrylic substrate on top of the printed ink and cured, resulting in an optically continuous composite structure with the light scattering silica particles encased at the interface between the two acrylic layers. As described above, the top and bottom surfaces of this composite light guide plate are free from features which may become damaged or collect dust and the light scattering features are contained within the composite structure.

The invention claimed is:

1. A light guide device comprising one or more light sources coupled to a light guide plate, wherein said light guide plate comprises:
   a first layer of light guiding material,
   a second layer of light guiding material which is mounted upon a surface of the first layer of light guiding material, and
   one or more light scattering features embedded within at least one of the first and second layers of light guiding material and located at the interface between the first and second layers of light guiding material,
   wherein light from the one or more light sources is guided within both the first layer of light guiding material and the second layer of light guiding material by total internal reflection,
   wherein said one or more light scattering features disturb the total internal reflection of the guided light and the disturbed light is emitted in a direction which is perpendicular or substantially perpendicular to the direction of the guided light, and
   wherein the one or more scattering features are dispersed within a transparent ink.

2. The light guide plate device according to claim 1, wherein the first and second layers of light guiding material are made from a transparent polymer sheet.

3. The light guide plate device according to claim 1, wherein the refractive indices of the first and second layers of light guiding material are the same or substantially the same.

4. The light guide plate device according to claim 1, wherein the refractive index of the first and second layers of light guiding material are independently of each other about 1.4 to about 1.7.

5. The light guide plate device according to claim 1, wherein the thickness of the first and second layers of light guiding material are independently of each other about 0.1 mm to about 10 mm.

6. The light guide plate device according to claim 1, wherein the refractive index of the one or more light scattering features is greater than the refractive index of the first layer of light guiding material.

7. The light guide plate device according to claim 1, wherein the refractive index of the transparent ink is equal to or substantially equal to the refractive index of the first layer of light guiding material.

8. The light guide plate device according to claim 1, wherein the one or more scattering features are in particulate form.

9. The light guide plate device according to claim 8, wherein the particle size of the particles is in the range of about 1 µm to about 20 µm.

10. The light guide plate device according to claim 8, wherein the particles are silica particles.

11. The light guide plate device according to claim 1, wherein the refractive index of at least one of the scattering features is about 1.6 to about 2.

12. The light guide device according to claim 1, wherein the one or more light sources are selected from LEDs, cold cathode fluorescent lamps, laser diodes, organic light emitting diode sources, and other electroluminescent devices.

13. The light guide device according to claim 12, wherein the one or more light sources are selected from one or more LEDs.

14. The light guide device according to claim 1, wherein the light guide device is edge-lit.

15. The light guide device according to claim 1, wherein the one or more light sources are not encapsulated by a layer of light guiding material.

16. A display device comprising the light guide device of claim 1.

17. The display device according to claim 16, wherein the display device comprises a liquid crystal cell.

18. A method of producing a light guide device, comprising:
   producing a light guide plate which comprises: (a) applying to a surface of a first layer of light guiding material one or more light scattering features; and (b) mounting a second layer of light guiding material on the surface of the first layer of light guiding material such that the first and second layers of light guiding material are optically joined by applying the second layer of light guiding material directly to the surface of the first light guiding material and the one or more light scattering features, and said one or more light scattering features are located at the interface between the first and second layers of light guiding material; and
   combining said light guide plate with one or more light sources,
   wherein step (a) comprises applying to the surface a transparent ink comprising the one or more light scattering features and curing the ink.

19. The method according to claim 18, wherein an additive printing method is used to apply the one or more light scattering features.

20. The method according to claim 19, wherein the additive printing method is a screen printing method.

21. The method according to claim 18, wherein (b) comprises applying a liquid polymer on the surface, and curing the liquid polymer.

22. The method according to claim 18, wherein the second light guide layer is a polymer sheet and (b) comprises laminating the polymer sheet to the first light guide layer.

* * * * *